United States Patent
Heiskanen et al.

(10) Patent No.: US 12,286,752 B2
(45) Date of Patent: *Apr. 29, 2025

(54) METHOD FOR DEWATERING A WEB COMPRISING MICROFIBRILLATED CELLUOSE AND A FILM PRODUCED FROM THE DEWATERED WEB

(71) Applicant: Stora Enso OYJ, Helsinki (FI)

(72) Inventors: Isto Heiskanen, Imatra (FI); Kaj Backfolk, Lappeenranta (FI); Jukka Kankkunen, Imatra (FI); Anna Kauppi, Lappeenranta (FI); Mikael Hjerpe, Karlstad (SE); Juha Korvenniemi, Orineimi (FI)

(73) Assignee: Stora Enso OYJ, Helsinki (FI)

( * ) Notice: Subject to any disclaimer, the term of this patent is extended or adjusted under 35 U.S.C. 154(b) by 140 days.

This patent is subject to a terminal disclaimer.

(21) Appl. No.: 18/003,187

(22) PCT Filed: Jun. 24, 2021

(86) PCT No.: PCT/IB2021/055592
§ 371 (c)(1),
(2) Date: Dec. 23, 2022

(87) PCT Pub. No.: WO2021/260608
PCT Pub. Date: Dec. 30, 2021

(65) Prior Publication Data
US 2023/0257937 A1 Aug. 17, 2023

(30) Foreign Application Priority Data
Jun. 26, 2020 (SE) .................................. 2050770-3

(51) Int. Cl.
*D21F 3/02* (2006.01)
*C08J 5/18* (2006.01)
*D21C 9/00* (2006.01)
*D21F 11/14* (2006.01)
*D21H 11/18* (2006.01)

(52) U.S. Cl.
CPC ............. *D21F 3/0218* (2013.01); *C08J 5/18* (2013.01); *D21F 11/145* (2013.01); *D21H 11/18* (2013.01); *C08J 2301/02* (2013.01); *D21C 9/002* (2013.01)

(58) Field of Classification Search
CPC ...... D21F 3/0218; D21F 11/145; D21F 11/00; C08J 5/18; C08J 2301/02; D21H 11/18; D21C 9/002; B82Y 30/00; B32B 2307/7244
See application file for complete search history.

(56) References Cited

U.S. PATENT DOCUMENTS

| | | |
|---|---|---|
| 2007/0224419 A1 | 9/2007 | Sumnicht et al. |
| 2010/0124651 A1 | 5/2010 | Rousseau et al. |
| 2015/0068973 A1* | 3/2015 | Bessonoff ............... F26B 13/28 210/500.29 |
| 2018/0245286 A1 | 8/2018 | Heiskanen et al. |
| 2019/0226146 A1 | 7/2019 | Pihko et al. |
| 2019/0234020 A1* | 8/2019 | Backfolk ............... D21H 27/38 |
| 2019/0248988 A1 | 8/2019 | Heiskanen et al. |
| 2020/0325626 A1 | 10/2020 | Pihko et al. |
| 2021/0324580 A1* | 10/2021 | Heiskanen ............... D21F 3/02 |

FOREIGN PATENT DOCUMENTS

| | | | |
|---|---|---|---|
| CN | 104321131 A | 1/2015 | |
| CN | 108291364 A | 7/2018 | |
| CN | 109219633 A | 1/2019 | |
| CN | 109415519 A | 3/2019 | |
| CN | 109715883 A | 5/2019 | |
| CN | 111304967 A | 6/2020 | |
| JP | 2019023360 A | 2/2019 | |
| RU | 2008141716 A | 4/2010 | |
| WO | 2017221137 A1 | 12/2017 | |
| WO | 2020095254 A1 | 5/2020 | |
| WO | WO-2020095254 A9 * | 12/2020 | ............. C08B 15/02 |

OTHER PUBLICATIONS

International Search Report from corresponding PCT application No. PCT/IB2021/055592, mailed on Jul. 23, 2021.
D. Fengel, Ultrastructural behaviour of cell wall polysaccharides, Tappi, 1970, vol. 53, No. 3, pp. 497-503.
Gary Chinga-Carrasco, Cellulose fibres, nanofibrils and microfibrils: The morphological sequence of MFC components from a plant physiology and fibre technology point of view, Chinga-Carrasco Nanoscale Research Letters, 2011, 6:417, http://www.nanoscalereslett.com/content/6/1/417.
Murong Gong, Introduction to Pulping and Papermaking, China Light Industry Press, p. 199, Mar. 21, 2019, ISBN: 978-7-5184-2367-5.
Zhonghou Wang, Pulping and Papermaking Equipments and Operations, China Light Industry Press, p. 297, May 31, 2006, ISBN: 7-5019-5266-3.

(Continued)

*Primary Examiner* — Dennis R Cordray
*Assistant Examiner* — Matthew M Eslami
(74) *Attorney, Agent, or Firm* — Greer, Burns & Crain, Ltd.

(57) ABSTRACT

The present invention relates to a method for dewatering a web comprising microfibrillated cellulose, wherein the method comprises the steps of: providing a suspension comprising between 50 wt-% to 100 wt-% of microfibrillated cellulose based on total dry weight, forming a fibrous web of said suspension on a support wherein said web has a dry content of 1-25% by weight, applying a dewatering felt into direct contact with the fibrous web, conducting said fibrous web, arranged between said dewatering felt and said support, through at least one shoe press equipment, drying the dewatered web to form a film which film has an Oxygen Transmission Rate (OTR) value (23° C., 50% RH) below 100 $cc/m^2/24$ h according to ASTM D-3985.

12 Claims, No Drawings

(56) References Cited

OTHER PUBLICATIONS

Chinese Office Action from corresponding Chinese patent application No. 202180045496.2 issued on Mar. 18, 2024.
Zhonghou Wang, Pulping and Papermaking Equipments and Operations, China Light Press Industry Press, ISBN 7-5019-1765-5.
Xiang JL, New Technologies for Utilization of Biomass Energy and Wastes, Jilin University Press, ISBN 978-7-5601-9511-7.
Chinese Office Action from corresponding Chinese patent application No. 202180045496.2 issued on Sep. 5, 2023.

* cited by examiner

METHOD FOR DEWATERING A WEB COMPRISING MICROFIBRILLATED CELLUOSE AND A FILM PRODUCED FROM THE DEWATERED WEB

This application is a U.S. National Phase under 35 U.S.C. § 371 of International Application No. PCT/IB2021/055592 filed Jun. 24, 2021, which claims priority under 35 U.S.C. §§ 119 and 365 to Swedish Application No. 2050770-3 filed Jun. 26, 2020.

TECHNICAL FIELD

The present invention relates to a method for dewatering a fibrous web comprising microfibrillated cellulose and a film comprising microfibrillated cellulose produced from the dewatered web.

BACKGROUND

Films comprising high amounts of microfibrillated cellulose (MFC) has been known to have good strength, oil and grease resistance and oxygen barrier properties. However, it is not easy to produce films at a high production speed and achieve the barrier properties needed.

It is especially difficult to dewater and produce the film at high speed due to the characteristic properties of microfibrillated cellulose. When MFC films are used, for example as barriers, it is crucial that the films don't have any pinholes or other defects that negatively would affect the barrier properties. Thus, it is important that the surface of the MFC film is defect free.

Wet laid techniques can be used for the production of MFC films, i.e. dewatering a furnish comprising said MFC on a wire. However, it is difficult to produce an MFC film with good barrier properties at high production speed by wet laid techniques. It is easy to get wire marks which will negatively affect the barrier and optical properties of the film. Furthermore, it is difficult to get a good retention of small fibrils present in the furnish when using a wire.

It is possible to create smooth MFC films by using film casting methods, i.e. casting of a suspension on a plastic or metal surface and then drying the suspension slowly to form a film. Casting methods have been shown to produce MFC films with very smooth surfaces with good barrier properties. However, the method is too slow and inefficient for production in commercial scale.

There is thus a need for a new method to dewater a suspension comprising microfibrillated cellulose and to produce an MFC film with good barrier properties at a high production speed.

SUMMARY

It is an object of the present invention to provide a method for dewatering and producing a film comprising microfibrillated cellulose in an efficient way without negatively affecting the barrier properties of the film, which method further eliminates or alleviates at least some of the disadvantages of the prior art methods.

The invention is defined by the appended independent claims. Embodiments are set forth in the appended dependent claims and in the following description.

The present invention relates to a method for dewatering a web comprising microfibrillated cellulose, wherein the method comprises the steps of: providing a suspension comprising between 50 wt-% to 100 wt-% of microfibrillated cellulose based on total dry weight, forming a fibrous web of said suspension on a support wherein said web has a dry content of 1-25% by weight, applying a dewatering felt into direct contact with at least one side of the fibrous web, conducting said fibrous web, arranged between said dewatering felt and said support, conducting said fibrous web, arranged between said dewatering felt and said support, through at least one shoe press equipment and drying the dewatered web to form a film which film has an Oxygen Transmission Rate (OTR) value (23° C., 50% RH) below 100 cc/m$^2$/24 h according to ASTM D-3985.

The drying of the dewatered web, i.e. the fibrous web being conducted through the at least one shoe press equipment to form a film, is preferably done by any known method.

It has been found that it is possible to dewater a web comprising high amounts of microfibrillated cellulose in a shoe press equipment. It was surprisingly found that the use of a shoe press equipment compared to other pressing equipment, even compared to pressing equipment with extended nips, made it possible to improve the dewatering of the film without destroying the barrier properties of the film.

The at least one shoe press equipment preferably has a nip length of at least 150 mm, preferably between 150-350 mm.

The linear load in the at least one shoe press equipment is between 250-1500 kN/m. It is preferred that the linear load used in the shoe press equipment is changed during the treatment of the fibrous web in the shoe press equipment. By gradually or stepwise increasing the linear load in the shoe press equipment, i.e. in the shoe press nip, the dewatering of the web is improved, i.e. a web with a higher dry content can be produced without destroying the barrier properties. It is also possible that the linear load is increased at a pulse during treatment in the nip, i.e. the linear load is increased at least one time in at least one pulse during treatment of the fibrous web in the shoe press equipment.

The fibrous web arranged between said dewatering felt and said support is preferably conducted through at least one press equipment before being conducted through the at least one shoe press equipment. In this way the dewatering of the fibrous web is first done by conducting the fibrous web through at least one press equipment.

It may be preferred that at least two shoe press equipment are used wherein the at least two shoe press equipment are being located after each other. The fibrous web is then first conducted through a first shoe press equipment and then through the second shoe press equipment. In this way it was found possible to even further improve the dewatering of the fibrous web and still be able to produce a film with good barrier properties. The nip pressure used in the first shoe press equipment is preferably lower than the nip pressure used in the second shoe press equipment. The at least two shoe presses of the shoe press equipment are preferably located at different sides of said fibrous web. In this way it is possible to dewater the web from both directions through the fibrous web. When more than one shoe press equipment is used it is preferred that the total nip length, i.e. the sum of the nip lengths of the shoe presses, is above 350 mm, preferably above 400 mm and even more preferred above 450 mm.

The fibrous web is preferably conducted through at least one smoothening roll equipment after being conducted through the shoe press equipment. It is preferred that the fibrous web if conducted through the smoothening roll equipment before being dried.

The support is preferably a metal support. The metal support is preferably heated to a temperature between 30-150° C. before the web is applied to the support. The fibrous web is preferably formed by cast coating.

The support may also be a porous wire. It is thus possible to use a wire in a paper or paperboard machine as the support and thus dewater and consequently produce the film in a paper or paperboard machine.

The fibrous web preferably has a dry content of 25-45 wt-% after being conducted through the at least one shoe press equipment.

The web is preferably conducted through the shoe press equipment at a speed of at least 150 m/min. It is thus possible to dewater the web at a high speed and still be able to produce a web with high dry content to produce a film having very good barrier properties.

The fibrous web preferably comprises more than one layer of microfibrillated cellulose, i.e. more than one fibrous web. In this way a multiply film comprising more than one layer of microfibrillated cellulose is formed.

The fibrous web comprising more than one layer of microfibrillated cellulose is formed by subjecting at least two suspensions of microfibrillated cellulose to a support. The at least two suspensions may be added to the support either in a multiply headbox or by the use of two different headboxes. The at least two suspensions comprising microfibrillated cellulose is applied to said support so that the first suspension applied onto the support, i.e. in direct contact with said support and the other suspension is applied onto the applied first suspension. In this way a multiply fibrous web is formed. The dewatering felt is thereafter applied onto the multiply fibrous web and it is thereafter conducted through the shoe press equipment.

It may also be possible to attach two or more fibrous webs together after formation on a support, e.g. wire, to form a multiply film, i.e. a first fibrous web is formed on a first support from a first headbox and a second fibrous web is formed on a second support from a second headbox. The first and second fibrous webs are thereafter attached to each other to form a multiply fibrous web. A dewatering felt is applied into direct contact with at least one side of the multiply fibrous web, said multiply fibrous which is arranged between said dewatering felt and said support, is conducted through at least one shoe press equipment. Consequently, it is possible to produce a multiply fibrous web by using two, three or more headboxes and supports and then attach the fibrous webs produced to each other and conduct the multiply fibrous web comprising more than one fibrous web through a shoe press equipment to produce a multiply film.

The film produced according to the method described above, preferably has a grammage below 100 gsm, preferably between 18-100 gsm, even more preferred between 20-80 gsm and a density above 700 kg/m$^3$. The film preferably has an Oxygen Transmission Rate (OTR) value (23° C., 50% RH) below 100 cc/m$^2$/24 h according to ASTM D-3985, preferably below 80 or even more preferred below 60 cc/m$^2$/24 h. It is consequently possible to produce a thin high-density film comprising high amounts of MFC that has very good oxygen barrier properties at a high production speed.

DETAILED DESCRIPTION

It has surprisingly been found that it is possible to dewater a web comprising MFC in an improved way by applying a dewatering felt into direct contact with the web followed by conducting the web through at least one shoe press equipment. The dewatering felt is applied into direct contact with at least one side of the fibrous web and said fibrous web, arranged between said dewatering felt and said support, is conducted through the at least one shoe press equipment. By the method according to the invention it is possible to dewater the web at high speed and still be able to produce a film from the dewatered fibrous web with good barrier properties. The dewatering of a web comprising high amounts of MFC is one of the most challenging process steps in order to produce a film with good barrier properties, i.e. to produce a product with a small amounts of pinholes or other irregularities that will negatively affect the barrier properties of the product. Consequently, it is important that the dewatering is done in a good way to avoid poor barrier properties. It has thus been very difficult to be able to increase the production speed of the dewatering step of a web comprising high amounts of microfibrillated cellulose without deteriorating the barrier properties. It was found that the use of at least one shoe press equipment makes it possible to use a dewatering profile that was very suitable when dewatering a fibrous web comprising high amounts of microfibrillated cellulose. It was found advantageous to be able to change the linear load profile in the shoe press nip, preferably by using at least one linear load impulse that sharply increased the linear load.

The produced film has an Oxygen Transmission Rate (OTR) value (23° C., 50% RH) below 100 cc/m$^2$/24 h according to ASTM D-3985, preferably below 80 or even more preferred below 60 cc/m$^2$/24 h. The OTR value was measured at 23° C. at a Relative Humidity (RH) value of 50%.

The suspension comprises between 50 wt-% to 100 wt-% of microfibrillated cellulose based on total dry weight, preferably between 70 wt-% to 100 wt-%. Thus, a film produced from the dewatered fibrous web comprises high amount of MFC, preferably between 70-100% by weight of MFC, this relates to the amount of MFC in the film per se before eventual coating layers have been added.

The suspension preferably has a water retention value (WRV) as specified in the Scandinavian test method SCAN-C 62:00 above 150%, more preferably above 200% or even more preferably above 300%. The WRV value was measured on a centrifuged suspension that was weighed before and after oven drying at 105° C. to determine WRV as expressed in %.

With dewatering felt is meant a felt that is permeable and allows water to be removed from the web either by absorbing the water or by allowing the water to be removed through the felt. Dewatering felts is today often used for dewatering paper or paperboard webs. Any known dewatering felt can be used. It is preferred to use felts with a fine surface, e.g. vacuum felts which has a finer surface and coarser backside. The dewatering felt can be single or double felted.

It can be preferred to use more than one dewatering felts, preferably two dewatering felts. It is preferred to use a first dewatering felt with low grammage and low water permeability that would prevent fines to penetrate through the felt and a second dewatering felt with high water absorption properties.

The felt or felts is preferably cleaned and dewatered after being conducted through the shoe press equipment and separated from the dewatered web.

With shoe press equipment is meant a pressing equipment comprising a shoe press nip. Any known shoe press equipment can be used. The shoe press nip can either be formed by using a shoe press and a roll or by using a large diameter soft roll and a roll. The roll preferably has a synthetic belt but it can also have a metal belt. The large diameter soft roll can have a diameter of 1.5-2 meters.

The at least one shoe press equipment preferably has a nip length of at least 150 mm, preferably between 150-350 mm. The nip length is preferably at least 200 mm, preferably between 200 and 300 mm.

The linear load in the at least one shoe press equipment is between 250-1500 kN/m, i.e. this is the maximum linear load to be used in the shoe press equipment. It is preferred that the linear load used in the at least one shoe press equipment is changed during the treatment of the fibrous web in the shoe press equipment. By gradually or stepwise increasing the linear load in the shoe press equipment, i.e. in the shoe press nip, the dewatering of the web is improved, i.e. a web with a higher dry content can be produced without destroying the barrier properties. It is also possible that the linear load is increased at an impulse during treatment in the nip, i.e. the linear load is increased at least one time in at least one impulse during treatment of the fibrous web in the shoe press equipment. It may be possible to increase the linear load in at least two impulses during treatment in the shoe press equipment. The linear load in the impulse is sharply increased for a short period of time and then the linear load is reduced again. This can be repeated during treatment in the shoe press nip. If more than one shoe press equipment is used it is possible to use the same linear load profile in both shoe press equipment. However, it is often preferred to use different linear load profiles in the at least two shoe press equipment. In this way it is possible to design the linear load profile in such a way that the dewatering is improved without deteriorating the barrier properties of the dewatered film.

The position of the shoe press in relation to the fibrous web can be changed by changing the tilt angle of the shoe press. The tilt angle of the at least one shoe press is preferably between 7-24 degrees. The tilt angle affects the peak linear load and is a way to adjust the linear load to improve the dewatering efficiency of the film.

The method according to any of the preceding claims wherein the nip time is at least 30 ms. Depending on the nip length and the production speed the time in which the fibrous material is subjected to the pressure in the shoe press equipment varies.

The fibrous web arranged between said dewatering felt and said support is preferably conducted through at least one press roll equipment before being conducted through the at least one shoe press equipment. In this way the dewatering of the fibrous web is first done by conducting the fibrous web through at least one press roll equipment. It has surprisingly been found that the combination of at least one press roll equipment and at least one shoe press equipment makes it possible to improve the dewatering of the fibrous web and be able to improve the barrier properties. It may be preferred to conduct the fibrous web through two press roll equipment being located after each other and then trough at least one shoe press equipment. The combination of two press roll equipment and one shoe press equipment was found to be very good for improving the dewatering of the fibrous web. The linear load used in the at least one press roll equipment is preferably between 10-500 kN/m, preferably between 10-300 kN/m. It is preferred to use a higher nip pressure in the second press roll equipment compared to the nip pressure used in the first press roll equipment. Any known press roll equipment can be used. In the press roll equipment, a press roll nip is formed, preferably between two press rolls.

It may be preferred that at least two shoe press equipment are used wherein the at least two shoe press equipment are being located after each other. The fibrous web is then first conducted through a first shoe press equipment and then through the second shoe press equipment. In this way it was found possible to even further improve the dewatering of the fibrous web and still be able to produce a film with good barrier properties. The nip pressure used in the first shoe press equipment is preferably lower than the nip pressure used in the second shoe press equipment. The at least two shoe presses of the shoe press equipment are preferably located at different sides of said fibrous web, i.e. the first shoe press of the first shoe press equipment is located at a first side of the web and the second shoe press of the second shoe press equipment is located at a second side of the web. In this way it is possible to dewater the web from both directions through the fibrous web. When more than one shoe press equipment is used is it preferred that the total nip length, i.e. the sum of the nip lengths of each shoe press, is above 350 mm, preferably above 400 mm and even more preferred above 450 mm.

The geometric design of the at least two shoe presses of the shoe press equipment is preferably different, e.g. one shoe press can have a concave design and one shoe press can have a convex design.

The fibrous web is preferably conducted through at least one smoothening roll equipment after being conducted through the shoe press equipment. It is preferred that the fibrous web if conducted through the smoothening roll equipment before being dried. By using at least one smoothening roll equipment after the web has been conducted through the shoe press equipment the smoothness of the surface on at least one side of the web is improved. A smoother surface of the fibrous web will improve the barrier properties of the web. By using a smoothening roll equipment a more harsh drying profile can be used in the shoe press equipment without destroying the barrier properties of the web. In the smoothening roll equipment, a smoothening roll nip is formed between at least one smoothening roll and one counter roll, it is preferred to use two smoothening rolls to form the nip in the smoothening equipment.

The formed fibrous web is applied to a support on which the fibrous web is conducted through the shoe press equipment. It is important to apply the suspension to the support in such way that a homogeneous fibrous web is formed, meaning that the fibrous web should be as uniform as possible with as even thickness as possible etc.

The fibrous web is preferably formed by cast coating the suspension to a polymer or metal support. It was surprisingly found that by the dewatering method according to the invention makes it possible to increase the dewatering of a cast coated suspension on a support. Consequently, the present invention makes it possible to produce a smooth and good barrier property film at high speed by the use of cast coating. The support is preferably a metal support, i.e. the support is made from metal. The metal support of preferably heated to a temperature above 30° C., preferably between 30-150° C., preferably between 45-150° C., even more preferred between 60-100° C. before the web is applied to the support. By increasing the temperature of the belt and thus on the applied web it has been found possible to further increase the efficiency of the dewatering of the web in the shoe press equipment.

The support may be a porous wire, preferably a wire in a paper or paperboard machine. It is thus possible to apply the method in the wet end of a paper or paperboard machine. With paper or paperboard machine is meant any kind of paper making machine known to a person skilled in the art used for making paper, paperboard, tissue or any similar products The support may also be a paper or paperboard product. By the present invention it is possible to produce a multiply paper or paperboard product by applying a layer with microfibrillated cellulose according to the present invention.

The dry content of the fibrous web before being conducted through the shoe press equipment is preferably between 15-30 wt-%

The dry content of the fibrous web after dewatering in the at least one shoe press equipment is preferably between 25-45 wt-%.

The microfibrillated cellulose of the suspension preferably has a Schopper-Riegler (SR) value above 80, preferably above 90, even more preferably 95. Consequently, the suspension comprises a fine grade MFC quality which normally is very difficult to dewater.

The web is conducted through the shoe press equipment at a speed of at least 150 m/min, preferably above 200 m/min and even more preferably above 250 m/min. It is preferred that the speed is between 200-1000 m/min. With the present invention it was found possible to increase the production speed for dewatering a fibrous web comprising high amounts of MFC. Consequently, since the dewatering often is the most challenging process step for the production of an MFC film having good barrier properties, the production speed of the entire film can also be improved and it makes it possible to produce a MFC film in a much more cost efficient way.

The fibrous web is preferably heated before the dewatering felt is applied into contact. In this way the temperature and the solid content of the fibrous web is increased which further improves the subsequent dewatering of the fibrous web. The increased heat may be applied using any known way. The fibrous web is preferably heated to a temperature between above 40° C., preferably between 50-95° C.

The fibrous web preferably comprises more than one layer of microfibrillated cellulose. In this way a multilayer film comprising more than one layer of microfibrillated cellulose is formed. It has surprisingly been found that the use of a dewatering felt and a shoe press equipment when dewatering a multilayer fibrous web improved the barrier properties of the final film. The fibrous web comprising more than one layer of microfibrillated cellulose is preferably formed by subjecting at least two suspensions comprising microfibrillated cellulose to a support. The at least two suspensions may be added to the support either in a multiply headbox or by the use of two different headboxes. It may also be possible to use one or several flexJet headboxes to create the multilayered fibrous web. The at least two suspensions comprising microfibrillated cellulose is applied to said support so that the first suspension is applied onto the support, i.e. in direct contact with said support and the other suspension is applied onto the applied first suspension. In this way a multilayer fibrous web is formed. The dewatering felt is thereafter applied onto the multilayer fibrous web and it is thereafter conducted through the shoe press equipment for dewatering. The at least two suspensions comprising microfibrillated cellulose may comprise the same type, amount, consistency etc of microfibrillated cellulose or different types, amounts, consistencies etc of the at least two suspension may be used. The multilayer fibrous web may comprise two, three, four, five or more layers.

The invention further relates to a method to produce a film wherein the method comprises the steps of; providing a suspension comprising between 50 wt-% to 100 wt-% of microfibrillated cellulose based on total dry weight, preferably between 70 wt-% to 100 wt-% of MFC, forming a fibrous web of said suspension wherein said web has a dry content of 1-25% by weight, i.e. a wet fibrous web is formed, applying a dewatering felt into direct contact with the fibrous web, conducting said fibrous web, arranged between said dewatering felt and said support, through a shoe press equipment to form dewatered web and drying said web to form a film.

The dewatered fibrous web preferably has a dry content of 25-45 wt-% after dewatering in the shoe press equipment. The dewatered web formed may thereafter be further treated in order to form a film. The dewatered web may be dried or further dewatered in any conventional way, e.g. by additional pressing or conventional cylinder drying, by using vacuum and/or by the use of hot air, in order for it to have the appropriate dry content. The film preferably has a dry content above 90% wt-%, preferably above 95 wt-%. It may also be possible to treat the dewatered web in any way known to a person skilled in the art in order to produce a film, e.g. by calendering.

With film is meant a thin substrate with good gas, aroma or grease or oil barrier properties, preferably oxygen barrier properties. The film preferably has a grammage below 100 gsm, preferably between 18-100 gsm, even more preferred between 20-80 gsm and a density in the range from 700-1400 kg/m$^3$. The oxygen transmission rate (OTR) value of a film having a grammage of 30 g/m$^2$ at 23° C. and at a relative humidity of 50%, is preferably below 30 cc/m$^2$/24 h according to ASTM D-3985.

The film preferably has a Gurley-Hill value above 10 000 s/100 ml, more preferably higher than 15 000 s/100 ml, even more preferable higher than 20 000 s/100 ml and most preferably higher than 30 000 s/100 ml as measured according to standard ISO 5636/6.

The film preferably has a KIT value above 8 and more preferably above 9 and even more preferably above 10 as measured according to standard ISO 16532. KIT is a value of the grease resistance of the film.

Besides MFC, the film may also comprise longer cellulosic fibers, either hardwood or softwood fibers, preferably kraft pulp softwood fibers. It may be preferred that the film comprises a mixture of MFC with SR value above 90 and a more coarse MFC grade having a SR value between 60-90. The film may also comprise other additives, such as pigments, carboxymethylcelluose (CMC), retention chemicals, starch etc. The film may comprise minerals, such as clays and preferably bentonite. It may be preferred that the film comprises 10-50% by weight of bentonite. By increasing the bentonite content of the film it was found possible to increase the dry content of the web.

By the present invention it is possible to produce a film comprising microfibrillated cellulose that preferably has a grammage below 100 gsm, and a density above 700 kg/m$^3$. The film preferably has an Oxygen Transmission Rate (OTR) value (23° C., 50% RH) below 100 cc/m$^2$/24 h, more preferably below 80 cc/m$^2$/24 h according to ASTM D-3985 and even more preferred below 60 cc/m$^2$/24 h according to ASTM D-3985. The film according to the present invention is preferably a thin translucent or transparent film, with a high density, high smoothness and good barrier properties.

Microfibrillated cellulose (MFC) shall in the context of the patent application mean a nano scale cellulose particle fiber or fibril with at least one dimension less than 1000 nm. MFC comprises partly or totally fibrillated cellulose or lignocellulose fibers. The liberated fibrils have a diameter less than 1000 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., Cellulose fibres, nanofibrils and microfibrils; The morphological sequence of MFC components from a plant physiology and fibre technology point of view, Nanoscale research letters 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanocellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt-%) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The MFC film according to the present invention may be used as bag in boxes when packaging dry food such as cereals, as a wrapping substrate, as a laminate material in paper, paperboard or plastics and/or as a substrate for disposable electronics.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for dewatering a web comprising microfibrillated cellulose, wherein the method comprises the steps of:
    providing a suspension comprising between 50 wt-% to 100 wt-% of microfibrillated cellulose based on a total dry weight,
    forming a fibrous web of said suspension on a support wherein said fibrous web has a dry content of 1-25% by weight, wherein the fibrous web comprises more than one layer of microfibrillated cellulose,
    applying a dewatering felt into direct contact with the fibrous web,
    conducting said fibrous web, arranged between said dewatering felt and said support, through at least one shoe press equipment at a high speed of at least 150 m/min to dewater the fibrous web at the high speed to produce a dewatered web without deteriorating barrier properties, wherein a linear load in the at least one shoe press equipment is between 250-1500 kN/m and
    drying the dewatered web to form a film which film has an Oxygen Transmission Rate (OTR) value (23° C., 50% RH) below 100 cc/m$^2$/24 h according to ASTM D-3985.

2. The method as claimed in claim 1, wherein the at least one shoe press equipment has a nip length of at least 150 mm.

3. The method according to claim 1, wherein the linear load in the at least one shoe press equipment is changed during treatment of the fibrous web in the nip.

4. The method according to claim 1, wherein the fibrous web arranged between said dewatering felt and said support is conducted through at least one press roll equipment before being conducted through the at least one shoe press equipment.

5. The method according to claim 1, wherein at least two shoe press equipments are used, wherein the at least two shoe pressequipments are located one after the other.

6. The method according to claim 5, wherein the at least two shoe press equipments are located at different sides of said fibrous web.

7. The method according to claim 5, wherein a total nip length of the at least two shoe press equipments is at least 350 mm.

8. The method according to claim 1, wherein the fibrous web is conducted through a smoothening roll equipment after being conducted through the shoe press equipment.

9. The method according to claim 1, wherein the support is a metal support.

10. The method according to claim 1, wherein the fibrous web is formed by cast coating.

11. The method according to claim 1, wherein the support is a porous wire.

12. The method according to claim 1, wherein the fibrous web has a dry content between 25-45 wt-% after being conducted through the at least one shoe press equipment.

* * * * *